Nov. 12, 1968    R. D. HENDRICKSON ET AL    3,410,388
BOTTLE HANDLING APPARATUS
Filed Feb. 3, 1967    5 Sheets-Sheet 1
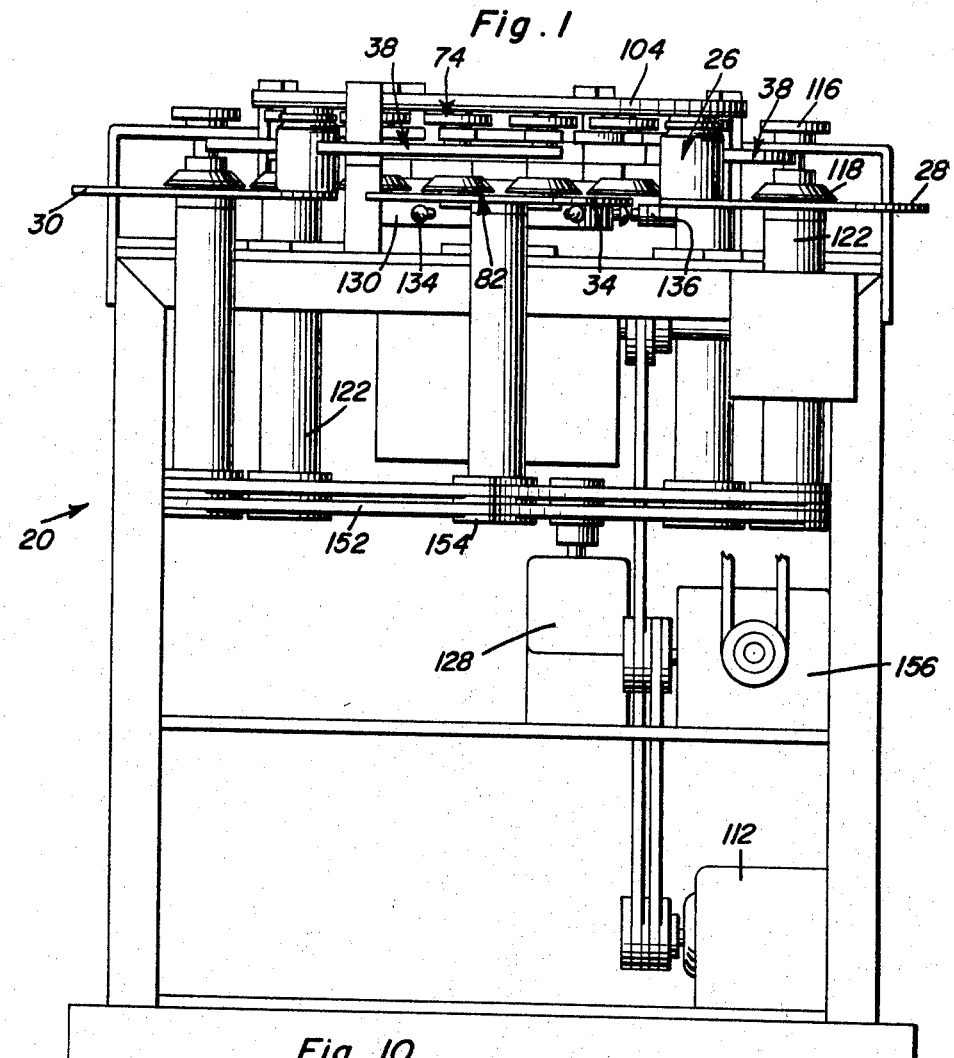
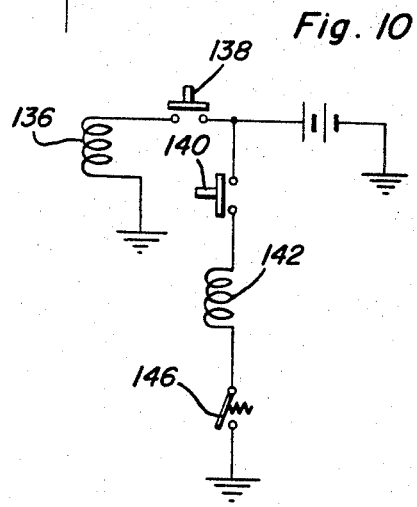
Robert D. Hendrickson
Robert B. Horn
INVENTORS
BY *Attorneys*

Nov. 12, 1968

R. D. HENDRICKSON ET AL 3,410,388

BOTTLE HANDLING APPARATUS

Filed Feb. 3, 1967

Robert D. Hendrickson
Robert B. Horn
INVENTORS

BY *(signatures)*
Attorneys

Robert D. Hendrickson
Robert B. Horn
INVENTORS

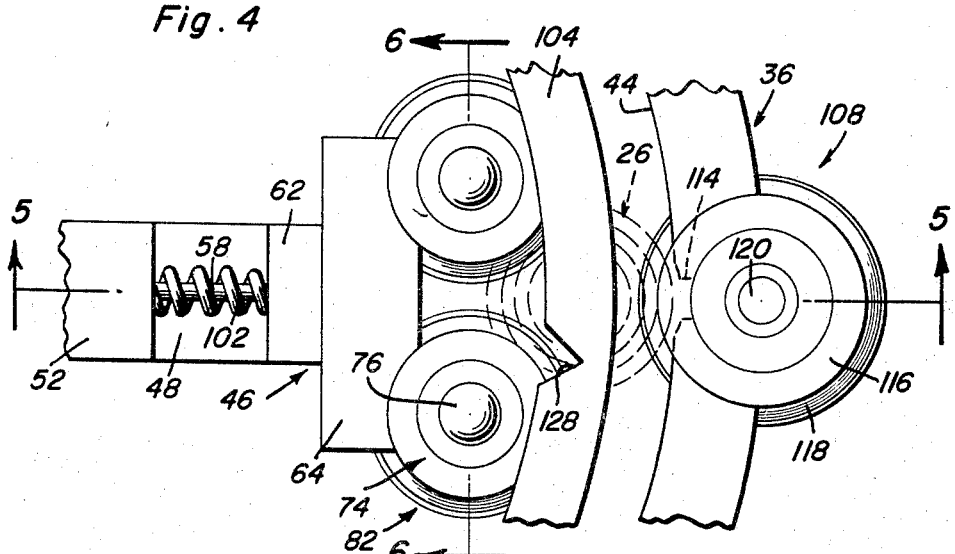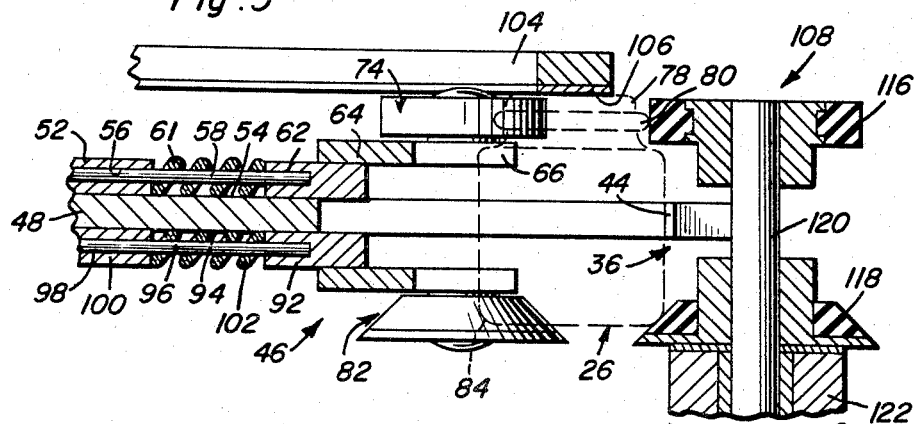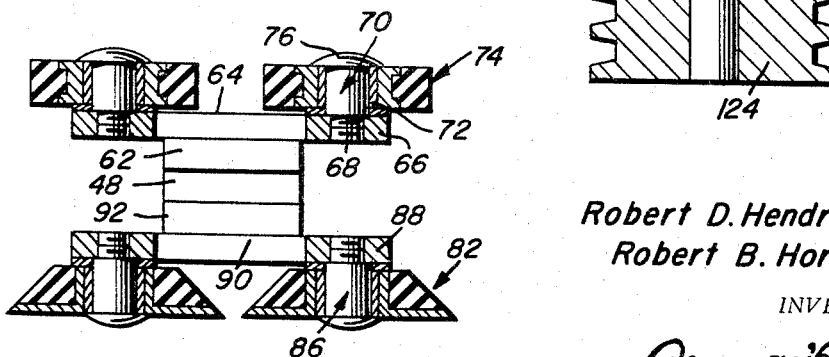

Nov. 12, 1968   R. D. HENDRICKSON ET AL   3,410,388
BOTTLE HANDLING APPARATUS
Filed Feb. 3, 1967                        5 Sheets-Sheet 5
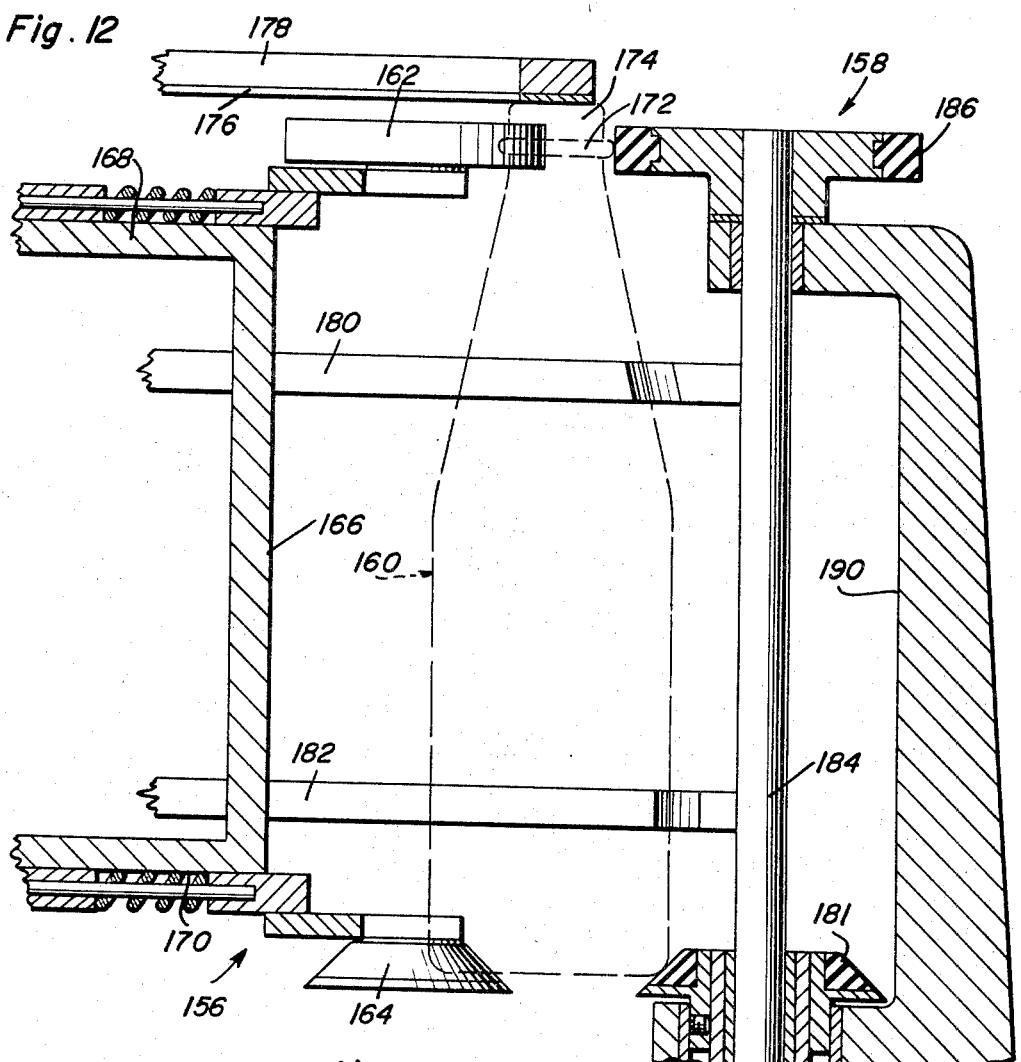
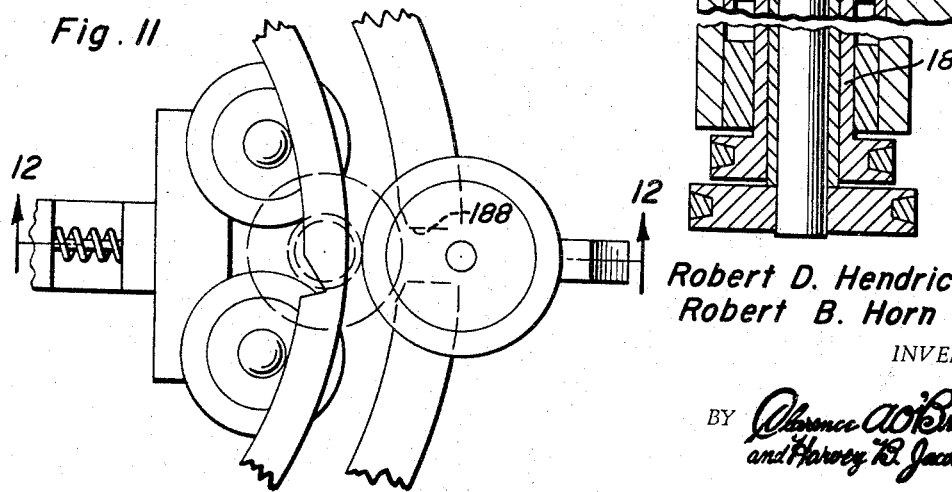
Robert D. Hendrickson
Robert B. Horn
INVENTORS

United States Patent Office 3,410,388
Patented Nov. 12, 1968

3,410,388
BOTTLE HANDLING APPARATUS
Robert D. Hendrickson, R.R. 2, and Robert B. Horn, 554
W. Washington, both of Winchester, Ind. 47394
Filed Feb. 3, 1967, Ser. No. 613,797
19 Claims. (Cl. 198—33)

ABSTRACT OF THE DISCLOSURE

A machine for receiving and moving a bottle along a predetermined path for the performance of various operations with regard to the bottle at stations along the path of movement thereof. The bottle holding portion of the machine engages the bottle, at least at the operative stations, solely at the upper finish portion and lower edge thereof in a manner which insures an exact location of the bottle and an exposure of all of the area thereof for the performance of specific operations, the bottle holding means being self-adjusting.

---

The present invention relates to new and useful improvements in bottle handling machines and is more specifically concerned with handling apparatus which is adapted to be utilized in conjunction with any operation wherein a series of bottles is to be progressively moved through a series of stations, whether this be for inspection, painting, labeling or the like.

It is primary object of the instant invention to provide bottle handling apparatus which will receive a glass bottle, jar, or other similar container for transfer along a predetermined path while maintaining an exact positioning of the finish or top area thereof, this being the critical area, thereby enabling the performance of the particular operations involved with a maximum degree of efficiency as during an inspection procedure, and with a maximum degree of uniformity, as in a painting or labeling operation.

It is likewise a primary intention of the instant invention to provide a bottle handling machine which is both capable of receiving and exactly positioning bottles in a manner which allows for a complete and true inspection thereof, through an exposure of all of the surfaces thereof, and by the same token, through an exposure of the complete side wall thereof, the application of any painted or adhesively secured labeling. Such a device is in contrast to the bottle handling units now in commercial use which are normally limited for use in connection with one particular operation, an inspection operation, a painting operation, or a labeling operation. Further, such commercial machines will frequently hold the bottles through an engagement of the side walls thereof by rollers, a setting of the bottles on stools, or an engagement of the top and bottom of the particular wear or bottles by cone-like gripping members. In any case, the bottle is not normally held with the degree of accuracy necessary to insure a proper inspection thereof, or a consistent location of the labeling. By the same token, such commercial devices do not allow for a complete access to the top, bottom and side walls of the bottle.

Furthermore, it is a significant object of the instant invention to provide apparatus which is both adaptable to irregularities in the bottles being handled, and capable of accommodating irregularly shaped bottles, such as catsup bottles or the like.

In addition, it is an object of the instant invention to provide a bottle handling machine wherein each bottle, as it approaches an operating station, is automatically introduced thereinto and, once in the station, rotated in a manner so as to effect a complete exposure thereof, while at the same time being retained with the critical finish area or portion at an exact predetermined point, determined by a reference plate, deemed most appropriate to obtain the best result.

Furthermore, it is an object of the instant invention to provide apparatus for the reception and handling of individual bottles or jars which can be incorporated into machines including additional features such as bottle introducing means, bottle removing means, reject disposing means, and the like, the actual apparatus of the instant invention being adaptable for either in-line systems or multiple head circular systems as specifically set forth in the official drawings.

Likewise, it is an important object of the instant invention to provide bottle handling apparatus which is basically simple in construction, notwithstanding the uniqueness of the specific structure involved and the operational advantages achieved thereby.

Basically, the invention, to achieve these objects, includes upper and lower sets of individually spring biased rollers which, through point contact with a bottle, retain the bottle against, and move the bottle along, a narrow guide rail. The bottle, at periodic stations, is released by the rail and rotatably driven by additional point contacting upper and lower rollers. The lower rollers in each instance also cam the bottle upward to an exact predetermined position defined by a reference plate.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an elevational view of a bottle handling machine incorporating the features of the instant invention;

FIGURE 4 is an enlarged top plan view of a portion of the machine at one of the inspection stations;

FIGURE 5 is a partial cross-sectional view taken substantially on a plane passing along line 5—5 of FIGURE 4.

FIGURE 6 is a partial cross-sectional view taken substantially on a plane passing along line 6—6 of FIGURE 4;

FIGURE 10 illustrates a basic circuit for the reject system;

FIGURE 11 is a top plan view, taken at a bottle spinning station, of a modified form of handling apparatus; and FIGURE 12 is a cross-sectional view taken substantially on a plane passing along line 12—12 in FIGURE 11.

Figure 2:
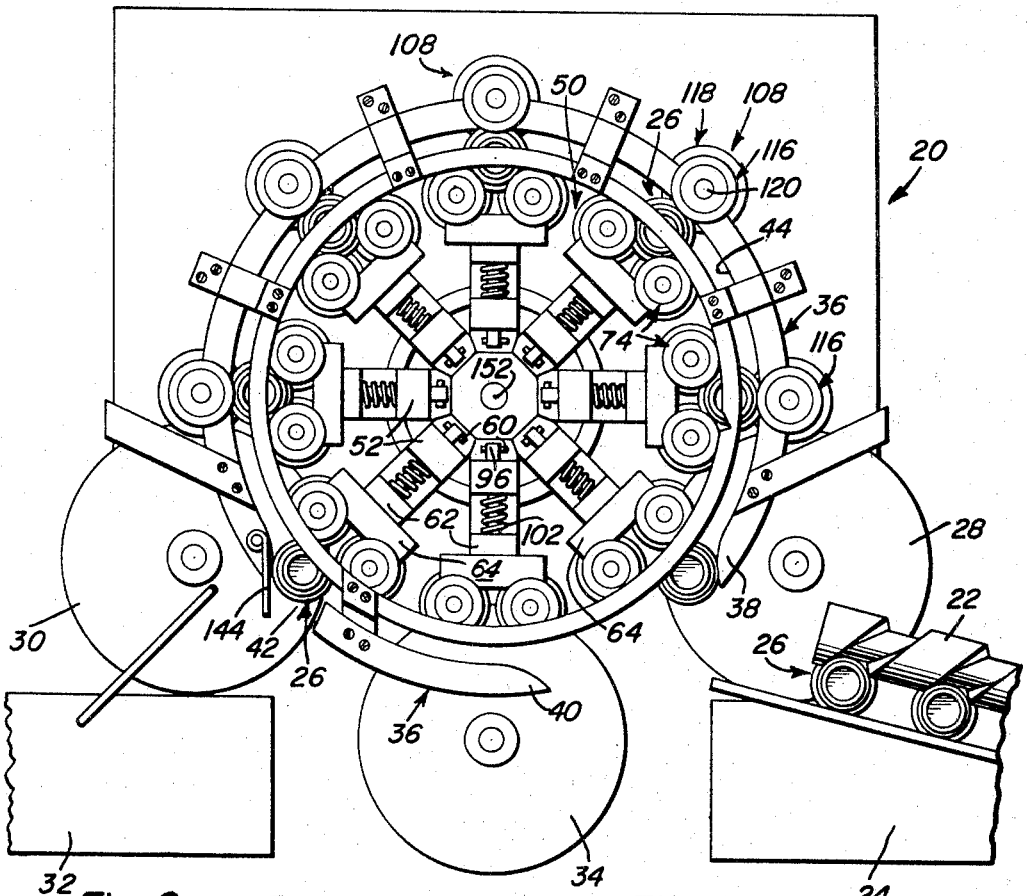
FIGURE 2 is atop plan view thereof.
Figure 8:
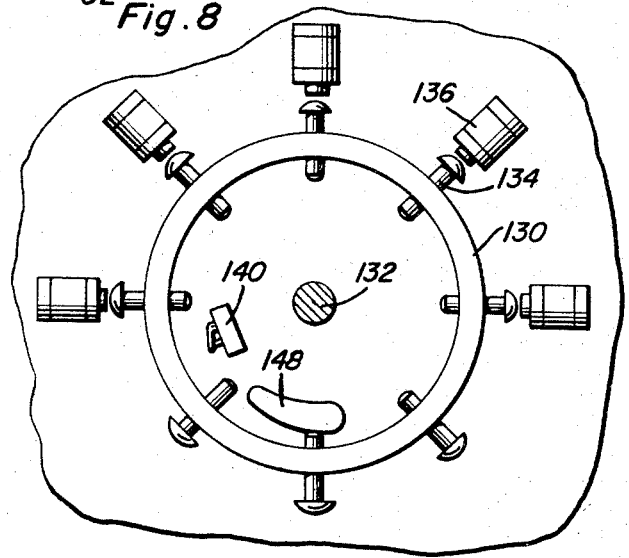
FIGURE 8 is a detailed view of a portion of the bottle reject system.

Referring now more specifically to the drawings, reference numeral 20 is used to generally designate a bottle handling machine incorporating the features of the instant invention. At this point it should be appreciated that the word "bottle" is used herein in a generic sense so as to include various types of transparent, normally glass, bottles, jars or the like.

Noting FIGURE 2 in particular, the machine 20 will preferably be so located as to receive bottles, jars or the like automatically, through a suitable feed means such as feed screw 22, from a continuous supply, this in the illustrated example comprising a conveyor 24. The individual bottles 26 will be positioned on a transfer disk 28 which functions so as to periodically introduce the bottles into the actual apparatus which holds and moves the bottles during the operations to be sequentially performed thereon. By the same taken, a second transfer disk 30 is provided adjacent the discharge portion of the machine 20 for transfer, though the manipulation of the reject system, of rejected bottles to a discharging means such as conveyor 32. A final transfer disk 34 can also be provided just beyond the reject transfer disk 30 with the disk 34 effecting a removal of all of the remaining bottles for either packaging or a movement thereof to a subsequent operation.

The actual handling apparatus itself includes an elongated horizontally orientated guide rail 36 which, when using a multi-headed circular unit as illustrated in the drawings, is annular in shape commencing at a first wide mouthed bottle receiving end 38, overlying the bottle introducing transfer disk 28, and terminating in a wide mouthed discharge end 40 orientated in bottle disposing relation to the discharge transfer disk 34. A suitable gate controlled discharged mouth 42 will also be provided in bottle discharging relation to the reject disposing transfer disk 30. The rail 36, in the basic form of the invention, will through the relatively narrow inner edge 44 thereof, normally engage the bottles 26 at approximately mid-height, as will be best noted in FIGURE 5.

Each bottle 26, as it is moved into engagement with the inner edge 44 of the guide rail 36 through the open forward end 38 thereof, is engaged by one of a plurality of holding heads 46 mounted on, in the illustrated embodiment, one of the plurality of radially extending arms 48 of the multi-headed unit 50.

Each arm 48 has a block or sleeve 52 affixed to the flat upper surface 54 thereof, the block 52 having a longitudinally extending rod receiving bore 56 therethrough. This bore or passage 56 slidably receives an elongated rod 58 therein, the rod 58 having a suitable stop means, such as pin 60, on the projecting inner end thereof so as to prevent a movement of the rod out of the bore 56. The forward end of the rod 58, in forwardly spaced relation to the forward end of the block or sleeve 52, is fixedly secured within a flat block 62 slidably engaged with the flat upper surface 54 of the arm 48 and biased forwardly relative to the block 52 by an expanded coil compression spring 64 engaged about the rod 58 between and in engagement with the blocks 52 and 62 in a manner which will be readily apparent from FIGURE 5. The block 62 in turn mounts, transversely across the upper surface thereof and forwardly projecting relation thereto, an elongated flat mounting plate 64 which is provided with a pair of integral forwardly projecting laterally spaced lugs 66 on the opposite end portions thereof. Each of the lugs 66 has the lower end portion 68 of a short shaft 70 fixed thereto, the shaft 70 in turn rotatably mounting, through appropriate bearing means 72 a rubber or other slightly compressible resilient material roller 74. Each of the rollers 74 is of course suitably retained on its shaft 78 by any appropriate means such as the enlarged shaft head 76 noted in FIGURE 6. The two rollers 74 are cylindrical in shape and present an annular vertical outer periphery for engagement with the finished portion 78 of the bottle 26, and in most instances, the take out bead 80 itself. A similar arrangement is used to mount a pair of conical bottle engaging rollers 82 for upwardly camming engagement with the lower normally bevelled edge 84 of the bottle 26. That is, each of the rollers 82 is rotatably mounted on a short shaft 86 which is fixedly secured to the forwardly projecting lug 88 on one end portion of a transversely extending mounting plate 90 fixed to the undersurface of a flat block 92 slidably engaged with the lower surface 94 of the arm 48. The block 92 is mounted and controlled by an elongated rod 96 fixed thereto and slidably received through an internal bore 98 in a block 100 fixed to the undersurface 94 of the arm 48 in subjacent relation to the upper block 52. Finally, an expanded coiled compression spring 102 is engaged between the blocks 100 and 92 for a forward resilient biasing of the rollers 82 independent of, yet in the same manner as, the upper rollers 74.

The upper and lower pairs of rollers 74 and 82, engaged with the finish area 78 and lower edge 84 of the bottle 26 at spaced points, cooperate in retaining the bottle 26 against the guiding inner surface 44 of the guide rail 36 for guided movement along the length thereof. Further, in order to insure an exact vertical positioning of the bottle 26 regardless of any minor irregularities which might naturally occur in the formation thereof, an elongated reference plate or rail 104 is provided generally coextensive with the guide rail 36 and in vertically spaced overlying relation between the holding head and the guide rail 36 for engagement with the top of the bottle 26 as will be best appreciated from FIGURE 5. This reference plate 104 will preferably be provided with a friction reducing bearing surface 106 against which each of the bottles 26 will in fact engage. As noted previously, the two spring biased lower truncated cone rollers 82 are in the nature of camming rollers, and as such, have an upwardly and inwardly inclined periphery thereon for effecting not only a cushioned force against the lower peripheral edge 84 of each bottle 26 for a retention thereof against the guide rail 36, but also an upper pressure thereon which retains the top of the individual bottles 26 against the smooth planar bearing surface 106 provided on the overhead reference plate 104. This particular relationship, insuring a constant and exact location or positioning of each of the bottles 26, is highly significant for substantially any bottle handling operation, whether it be inspection, painting or labeling.

Each of the holding heads 46 sequentially moves the contained bottle 26 to separate stations 108 along the guide rail 36 for the performance of such operations as may be desired on the bottles 26 in accordance with the particular type of machine involved, whether it be an inspection device or a bottle labeling or painting device. This sequential movement of the bottles 26 can be effected in any suitable manner, such as through the utilization of an appropriate Geneva movement 110 schematically illustrated in FIGURE 7, the movement 110 being appropriately belt-driven from a main power supply motor 112.

Figure 3:
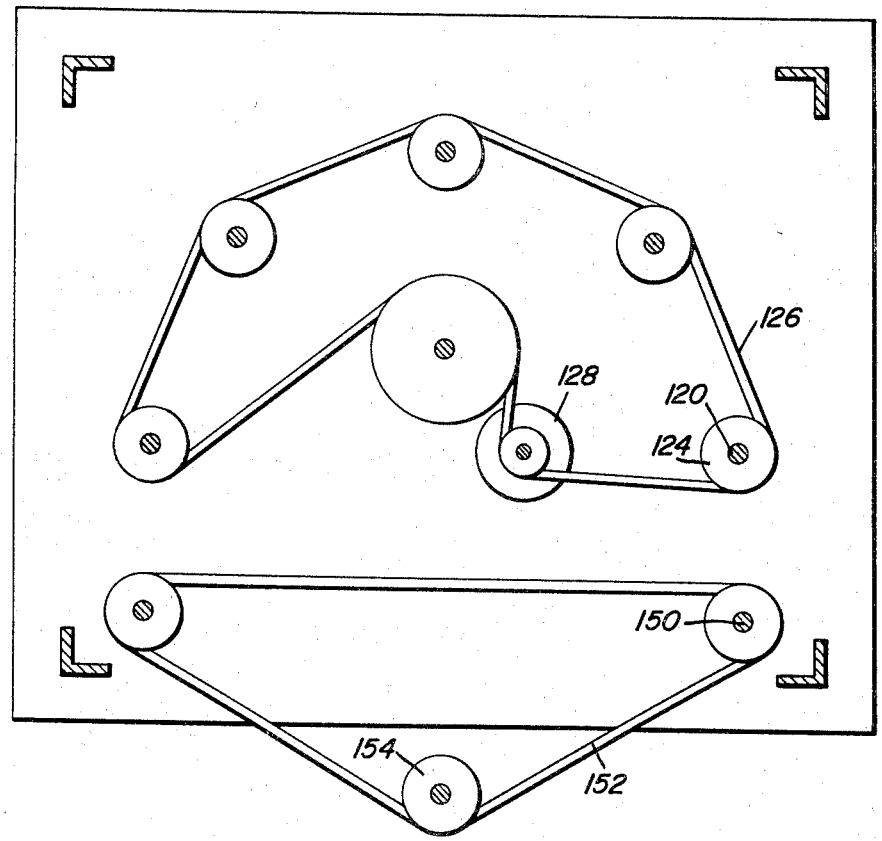
FIGURE 3 is a detailed view of the belt and pulley arrangement for the transfer disks and station bottle spinning rollers.
Figure 7:
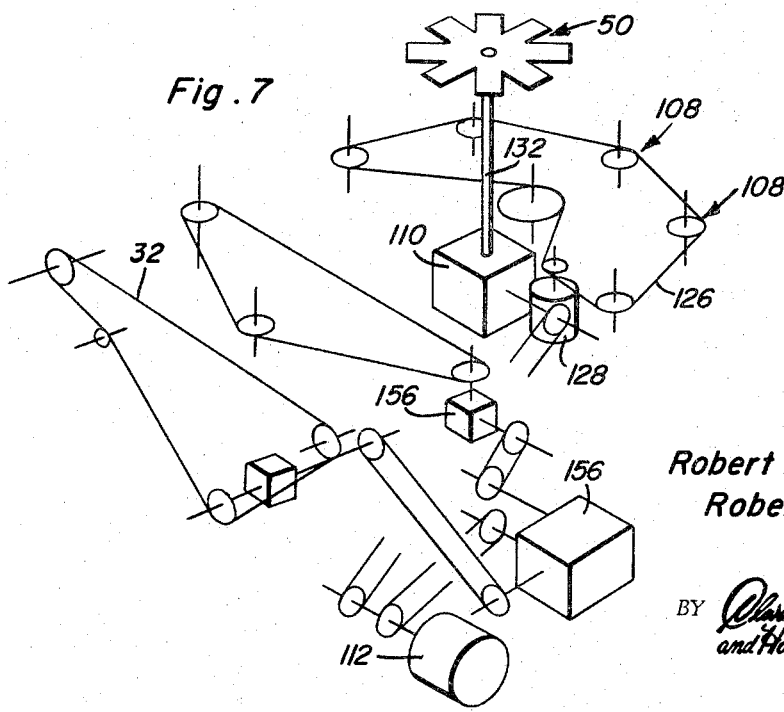
FIGURE 7 is a schematic view of the drive system for the machine.

At each station 108, noting FIGURES 4 and 5 in particular, a gap 114 is provided in the guide rail 36 which in effect results in a release of the bottle 26 by the guide rail 36. However, vertically aligned with the guide rail gap 114 and receiving and supporting the bottle 26 thereacross, is a pair of vertically spaced upper and lower rollers 116 and 118, both of a rubber-like material, as the rollers 74 and 82, and both mounted on a common shaft 120 which is rotatably received within a subjacent support cylinder 122. This shaft 120 is rotatably driven by means of a double sheave 124 mounted on the projecting lower end portion thereof and engaged by a pair of continuous drive belts 126 which are engaged about similar sheaves 124 associated with each of the station roller shafts 120. The upper station roller 116 is constructed in substantially the same manner as the upper holding head rollers 74 in that it is cylindrical in shape and provided with an annular vertical outer bearing edge which engages against the finished area 78, or in most instances the take-out bead 80, of the bottle 26. The lower roller 118, by the same token, is of a truncated conical shape presenting an upwardly and inwardly inclined annular periphery similar to the rollers 82 so as to, in the same manner, effect an upward camming of the bottle against the bearing surface 106 of the reference plate 104 through an engagement with the normally beveled lower edge 84 of the bottle 26. Thus, it will be appreciated that in each of the stations 108, a three-point contact is made with the bottle 26 both about the take-out bead and about the lower edge 34, thereby leaving substantially the entire exterior surface of the bottle 26 exposed for inspection, painting, labeling or the like. In conjunction with this substantially complete exposure of the exterior of the bottle 26, it is contemplated that, assuming the use of the handling apparatus in conjunction with bottle inspecting means, the reference plate 104 be appropriately notched as at 128 at each of the stations 108. The notch or notches provided in the reference plate 104 at each of the stations 108 are to be so orientated as to allow a free passage of the conventionally utilized light or radiant energy beams which are selectively passed through glassware during customary automatic inspection procedures. It will be appreciated that the positive and exact orientation or location of each of the bottles 26 through the camming rollers 84 and 118, and the reference plate 104 is particularly significant during an automatic optical inspection so as to avoid any distortion or incorrect readings which might result from a slightly out of line or misorientated bottle 26. As will also be appreciated, in each of the stations 108, the particular bottle 26 will be constantly rotated through engagement with the constantly rotating rollers 116 and 118 against which the bottle 26 is resiliently urged through the spring biased rollers 74 and 82. The length of time each bottle 26 is retained at each inspection station 108 would of course depend upon the particular operation being performed in accordance with the purpose of the over-all machine 20. After the predetermined lapse, the multi-headed unit will be activated, through the Geneva movement 110 or other suitable means, and the holding head, in conjunction with the bottle 26 retained thereby, moved past the station 108 and along the guide rail 36 to the next station 108. The spring biased nature of the rollers 74 and 82 enable the relatively firm gripping of the bottles 26 so as to effect the desired movement thereof both into and out of each of the stations 108. Incidentally, FIGURES 3 and 7 are of particular interest in illustrating the drive means for the station rollers which can include its own motor or power source 128.

Figure 9:
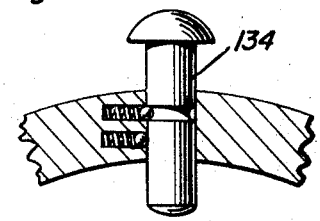
FIGURE 9 is a cross-sectional detail illustrating one manner of mounting the pins of FIGURE 8 for releasable retention in either of two positions.

Turning now particularly to FIGURES 8, 9, 10 and 2, attention is directed to the reject system incorporated into the machine, particularly when utilized as a handling means for bottle inspection purposes. This system includes a ring mounted on the multiple head unit, the shaft 132 thereof being noted in FIGURE 8, for rotation therewith. This ring 130 in turn mounts a plurality of radially orientated pins 134, each in vertical alignment with one of the radially extending arms 48. Each pin 134 is retained for movement between an outer position, as will be noted with regard to all of the pins in FIGURE 8 aside from the pin at seven o'clock, and an inner position. FIGURE 9 details one manner in which spring-biased ball detents can be utilized in releasably retaining each of the pins 134 in either the inner or outer position. Associated with each of the stations 108 is a solenoid unit 136 with which the pins 134 selectively align upon an engagement of the corresponding bottle within the corresponding station 108. At this time, if a reject is recorded at any particular station, an appropriate switch 138 is closed, either manually or automatically, so as to energize the appropriate solenoid unit 136 which in turn results in a hitting of the pin or push button 134 and movement thereof to its inner position as indicated in FIGURE 9. The pin 134, associated with the particular reject bottle, continues about its course of travel until, at a point just prior to the discharge mouth 42 associated with the reject transfer disk 30, a microswitch 140 is tripped. This in turn, through for example another solenoid unit 142, opens or allows the opening of a pivoted door or panel 144 which normally closes the discharge opening 42. The reject bottle 26 then passes outwardly through the opening 42 and onto the reject transfer disk 30 with the door 144, possibly through engagement of the bottle 26 with a bottle controlled switch 146, immediately closing until the microswitch 140 is again tripped by a subsequent reject registering pin 134. Each of the reject pins 134, after passing beyond the microswitch 140, is repositioned in its outermost position through a fixed cam 148 against which the inner end of the inwardly extended pin 134 engages. FIGURE 10 is of significance in illustrating a simplified electrical diagram relation to the reject system. The bottles 26 not rejected will continue along the guide rail 46 for subsequent discharge onto the discharge transfer disk 34. Incidentally, the illustrated embodiment of the machine 20 contemplates mounting the transfer disks 28, 30 and 34 on the upper ends of individual rotatably mounted shafts 150 which are in turn simultaneously driven by one or more belts 152 engaged over suitable shaft mounted sheaves 154. From FIGURE 7, it will be noted that the power for driving the transfer disks can be obtained directly from the main motor 112 through one or more gear boxes 156 and various belt and pulley units. By the same token, FIGURE 7 also illustrates one manner of simultaneously driving the conveyor 32 utilized in the removal of the rejects.

Referring now specifically to FIGURES 11 and 12, it will be noted that a modified holding head 156, in conjunction with a modified station unit 158, has been illustrated therein. This modified form, incorporating all of the features of the primary embodiment, is particularly adapted for the accommodation of irregularly shaped relatively larger bottles 160, such as for example catsup bottles, soda bottles or the like. The greater height of the bottle 160 is accommodated by increasing the vertical space between the upper pair of finish engaging rollers 162 and the lower pair of camming rollers 164, both sets of rollers being mounted for spring biased engagement with the bottle 160 in the same manner as the rollers 74 and 82. This increase in the vertical distance between the rollers 162 and 164 can be achieved through the provision of a greater thickness mounting arm or arm unit 166 which, in order to allow for a sliding movement of the upper and lower sets of rollers 162 and 164, includes flat upper and lower surfaces 168 and 170. As will be appreciated, the spring biased nature of the upper and lower sets of rollers enables a positive engagement with the bottle 160 regardless of the different diameters of the upper and lower portions thereof. For example, as noted in FIGURE 12, the upper spring biased rollers 162 firmly engage against the take-out bead 172 of the relatively narrow finish area 174 associated with the narrow neck of the bottle 160. The lower pair of camming rollers 164 of course retain the top of the bottle 160 against the bearing surface 176 of the planar overhead reference plate or rail 178. Furthermore, due to the greater height of the bottle 160, if deemed necessary both upper and lower guide rails 180 and 182 may be provided, the inner bearing edges of the rails being so defined as to correspond with the adjacent portions of the bottle 160 itself.

Turning to the typical modified station 158, it will be noted that the lower beveled bottle driving roller 181 is mounted on and driven by a hollow belt driven shaft 183 which surrounds an independently belt-driven solid shaft 184 to which the upper roller 186 is drivingly engaged. This independent driving of the lower and upper rollers 181 and 186, the upper roller 186 being of a greater diameter so as to engage the relatively narrower finish area 174 of the bottle 160, allows the driving of the upper and lower rollers at different speeds so as to, taking into account that the different diameters of the upper and lower portions of the bottle 160, effect a constant non-twisting rotation of the bottle 160 throughout the full height thereof. As was the case with the guide rail 36, the guide rails 180 and 182 have a gap 188 defined therein in the vicinity of each of the stations 158 whereby a support of the bottle 160 is effected solely by the three upper and three lower rollers. A suitable bracing or supporting arm 190 can be used to rotatably support the shafts 183 and 184 as required. By the same token, it will also be appreciated that suitable supports or braces, as more completely suggested in FIGURES 1 and 2, will be utilized to rigidly position the various guide rails and reference plates utilized.

In operation, a bottle 26 is, by means of a timing feed screw or the like, positioned on the transfer disk 28 which in turn introduces the bottle 26 into a pocket defined by the upper and lower rollers on the holding head 46. The upper rollers 74 engage the finish of the bottle while the two lower camming rollers 86 contact the beveled bottom edge 84 of the bottle. The third contact point provided is the elongated guide rail 36 against which the bottle 26 is compressed by the spring-loaded nature of the upper and lower rollers 74 and 82. The machine then proceeds to sequentially advance the bottle 26 into the stations 108, the bottle, at each station, disengaging from the guide rail 36 and coming into contact with the spinning third set of rollers 116 and 118. Within each station, the lowermost roller 118, also tapered, cooperates with the rollers 82 in holding the bottle to an exact predetermined height against the overlying reference plate which is in turn, assuming an inspection machine, provided with appropriate slots or notches for a full utilization of the inspection apparatus. When the handling apparatus is used in conjunction with painting or labeling operations, it will be recognized that there is a complete exposure of the side wall of the bottle at each of the stations, thereby allowing free access thereto. Further, it is also possible to adjust the vertical height of the guide rail or rails to allow free access to various portions of the side walls of the bottles should such also be desired between stations.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A bottle handling apparatus comprising elongated fixed bottle contacting guide means, at least one holding head mounted laterally of said guide means for travel therealong, said holding head including upper and lower bottle contacting means located in vertically spaced planes, means resiliently and independently biasing each contacting means toward said guide means for the retention of a bottle between said contacting means and said guide means during the travel of said head along said guide means, and bottle referencing means positioned between said holding head and said guide means in vertically spaced relation thereabove for engagement by the top of a retained bottle, said lower bottle contacting means including a camming portion thereon engageable with the lower peripheral edge of a retained bottle for an upward camming of a retained bottle against said reference means.

2. The apparatus of claim 1 wherein at least one of said bottle contacting means comprises a pair of laterally spaced rotatably mounted rollers.

3. The apparatus of claim 2 wherein the second of said bottle contacting means also comprises a pair of laterally spaced rotatably mounted rollers, the upper contacting means rollers being in the nature of vertical cylinders rotatable about parallel vertical axes, the lower contacting means roller being in the nature of upright truncated cones rotatably about vertical parallel axes, the conical surfaces of said lower rollers constituting said camming portion.

4. The apparatus of claim 3 including at least one operation station along said guide means, said guide means being relieved at said station for disengagement with a retained bottle, said station including bottle receiving and rotating means cooperatively operable with said upper and lower bottle contacting means for the retention of a bottle therebetween and the rotation of the retained bottle.

5. The apparatus of claim 4 wherein said station bottle receiving and rotating means comprises vertically spaced upper and lower rotatably drivable rollers.

6. The apparatus of claim 5 wherein the lower station roller includes a conical camming surface engageable with the lower peripheral edge of a retained bottle for an upward camming thereof.

7. The apparatus of claim 6 including an inspection facilitating relieved portion in said reference means at said station.

8. The apparatus of claim 7 including means for periodically introducing a bottle between said guide means and said holding head, a reject indicating displaceable member associated and travelable with said holding head, means at said station for selectively displacing said reject indicating member, means activatable by the displaced reject indicating member for effecting a discharge of the associated reject bottle at a predetermined point, and means for repositioning a displaced reject indicating member.

9. A bottle handling apparatus comprising elongated fixed bottle contacting guide means, at least one holding head mounted laterally of said guide means for travel therealong, said holding head including upper and lower bottle contacting means located in vertically spaced planes, means resiliently and independently biasing each contacting means toward said guide means for the retention of a bottle between said contacting means and said guide means during the travel of said head along said guide means, and at least one operation station along said guide means, said guide means being relieved at said station for disengagement with a retained bottle, said station including bottle receiving and rotating means cooperatively operable with said upper and lower bottle contacting means for the retention of a bottle therebetween and the rotation of the retained bottle.

10. The apparatus of claim 9 wherein said bottle receiving and rotating means comprises upper and lower rotatably drivable rollers, said lower roller including a conical camming surface engageable with the lower peripheral edge of a received bottle for effecting an upward camming thereof to a predetermined position.

11. A bottle handling apparatus comprising elongated fixed bottle contacting guide means, at least one holding head mounted laterally of said guide means for travel therealong, said holding head including upper and lower bottle contacting means located in vertically spaced planes, and means resiliently and independently biasing each contacting means toward said guide means for the retention of a bottle between said contacting means and said guide means during the travel of said head along said guide means, said guide means defining a relatively narrow elongated bearing edge against which a bottle is to be biasly engaged by the upper and lower bottle contacting means, said upper bottle contacting means being located in a plane above said guide means, and said lower bottle contacting means being located in a plane below said guide means edge.

12. For use in bottle handling apparatus, a travelling bottle receiving, positioning and moving unit, said unit including an elongated member having a free end thereon, upper and lower bottle contacting means mounted on said member at the free end thereof, means mounting said upper and lower means for independent longitudinal movement beyond said free end relative to both each other and to said member, and means independently and resiliently biasing said upper and lower bottle contacting means longitudinally outwardly of said member.

13. The structure of claim 12 wherein each of said upper and lower bottle contacting means comprises a pair of laterally spaced rotatably mounted rollers engageable with a received bottle at circumferentially spaced points thereabout.

14. A method of handling bottles during the performance of inspection or the like operation thereon comprising the steps of engaging a bottle at a first point centrally along the vertical height thereof, at two circumferentially spaced points about the finish thereof, and at two circumferentially spaced points about the lower peripheral edge thereof, biasing said bottle to a predetermined vertical location, moving said bottle along a predetermined horizontal path while retaining the point engagements thereof, and periodically releasing the first point engagement along the vertical height thereof and engaging each of said finish and said lower peripheral edges at a third point spaced from the two circumferentially spaced points, and rotating said upper and lower three-point engaged bottle.

15. A bottle handling apparatus comprising elongated fixed bottle contacting guide means, at least one holding head mounted laterally of said guide means for travel therealong, said holding head including upper and lower bottle contacting means located in vertically spaced planes, means biasing each contacting means toward said guide means for the retention of a bottle between said contacting means and said guide means during the travel of said head along said guide means, and bottle referencing means positioned between said holding head and said guide means in vertically spaced relation thereabove for engagement by the top of a retained bottle, said lower bottle contacting means including a camming portion thereon engageable with the lower peripheral edge of a retained bottle for an upward camming of a retained bottle against said reference means.

16. The apparatus of claim 15 wherein said camming portion is defined by at least one generally conical roller.

17. The apparatus of claim 16 including means for periodically introducing a bottle between said guide means and said holding head, a reject indicating displaceable member associated and travelable with said holding head, at least one operation station along said guide means, means at said station for selectively displacing said reject indicating member, means activatable by the displaced reject indicating member for effecting a discharge of the associated reject bottle at a predetermined point, and means for repositioning a displaced reject indicating member.

18. The apparatus of claim 17 including at least one operation station along said guide means, said guide means being relieved at said station for disengagement with a retained bottle, said station including bottle receiving and rotating means cooperatively operable with said upper and lower bottle contacting means for the retention of a bottle therebetween and the rotation of the retained bottle.

19. A bottle handling apparatus comprising elongated fixed bottle contacting guide means, at least one holding head mounted laterally of said guide means for travel therealong, said holding head including upper and lower bottle contacting means located in vertically spaced planes, means biasing each contacting means toward said guide means for the retention of a bottle between said contacting means and said guide means during the travel of said head along said guide means, and at least one operation station along said guide means, said guide means being relieved at said station for disengagement with a retained bottle, said station including bottle receiving and rotating means cooperatively operable with said upper and lower bottle contacting means for the retention of a bottle therebetween and the rotation of the retained bottle.

References Cited
UNITED STATES PATENTS

| | | | |
|---|---|---|---|
| 2,800,226 | 7/1957 | Drennan | 198—210 |
| 2,880,845 | 4/1959 | Carter | 198—33 |

RICHARD E. AEGERTER, *Primary Examiner.*